United States Patent [19]
Leeper

[11] 3,724,696
[45] Apr. 3, 1973

[54] TRUSS TRANSPORTING BODY

[76] Inventor: Charles G. Leeper, 1021 Wataguast, Kingsport, Tenn. 37660

[22] Filed: July 1, 1971

[21] Appl. No.: 158,739

[52] U.S. Cl..................................214/512, 214/390
[51] Int. Cl. .................................................B60p 1/54
[58] Field of Search ..214/75 R, 75 G, 390, 392, 394, 214/396, 512

[56] References Cited

UNITED STATES PATENTS

| | | | |
|---|---|---|---|
| 2,388,870 | 11/1945 | Sackett | 214/396 |
| 2,902,184 | 9/1959 | Buckner | 214/392 |
| 3,534,880 | 10/1970 | Washburn, Jr. et al. | 214/390 |
| 2,785,815 | 3/1957 | Cook | 214/396 |
| 3,221,911 | 12/1965 | Modloff et al. | 214/84 |
| 3,219,211 | 11/1965 | Malcom | 214/84 |

*Primary Examiner*—Gerald M. Forlenza
*Assistant Examiner*—Lawrence J. Oresky

[57] ABSTRACT

A truss transporting body is disclosed which is essentially self- loading and unloading and comprises a wheeled bed of metal framing or the like wherein a substantial portion of the bed is framed to provide an open bay at the rear thereof to longitudinally accommodate a truss bundle, and wherein a self-loading and unloading structure is provided at the rear of the sides of the bed, said structure being a movable lift bar which is insertable into guides after the inverted truss bundle has been tipped forward on its apex, and means are provided for elevating the lift bar, such as pulley means, to raise the truss bundle off of the ground to a transportable position.

8 Claims, 8 Drawing Figures

CHARLES G. LEEPER
INVENTOR.

CHARLES G. LEEPER
INVENTOR.

3,724,696

TRUSS TRANSPORTING BODY

This invention concerns a transporting body for use as a trailer or truck body for transporting large and unwieldy structures, and particularly concerns a self-loading and unloading transporting body for carrying roof trusses.

It is apparent that trailers or trucks for transporting such structures as roof trusses must be uncommonly sturdy and yet must be able to accommodate structures of lengths exceeding considerably the length of large trucks. To provide, therefore, a trailer or truck body construction which offers a minimum of weight and maximum of truss support and convenience of operation is a most elusive achievement.

Such unwieldy and heavy structures as roof trusses do not readily lend themselves to loading onto or unloading from truck beds of the like which requires, in a commercial operation, some powerful lifting device which can lift an entire bundle of trusses up to the level of the truck bed. At the delivery end of the process, the builder, as well as the trucker, is seldom in a position to provide a lifting device adequate to get the entire bundle of trusses off the truck and must compromise either by piecemeal unloading or by dumping the trusses. The time and effort thus involved in unloading, as well as the damage resulting from such a dumping operation, are of considerable concern to both the builder and the trucker.

Objects, therefore, of the present invention are: to provide a transporting body for use as a trailer or truck body and having a great load carrying capacity and extremely effective and convenient self- loading and unloading features; to provide such a body which is exceptionally safe to operate; and to provide for minimum unnatural stressing and straining of the trusses while in transit; and to provide a truss trailer which, if necessary, may be loaded or unloaded by a single person.

These and other objects hereinafter appearing have been attained in accordance with the present invention through unique trailer or truck body construction and arrangement of truss supporting structure for operation in conjunction with rear lifting means which allows rapid and convenient loading and unloading of the trusses. Principally, the unique trailer or truck body does not require lifting of the truss bundle to place the same relative to the body in essentially its transportable position, nor does it require some extraneous device to actually lift the trusses off the ground.

The invention, in its general sense, may be stated as a wheeled, truss transporting body comprising a forward section, side means extending rearwardly from said forward section to define therewith a truss accommodating bay open at the rear of said body, truss supporting means extending laterally of said forward section, upwardly directed guide means on the rear of each of said sides, a lift bar adapted to be positioned in said guide means to extend laterally across the rear of said body, and power means to move said lift bar upwardly or downwardly in said guide means.

Further understanding of the present invention can be had from the following detailed description and drawings wherein.

Figure 1:
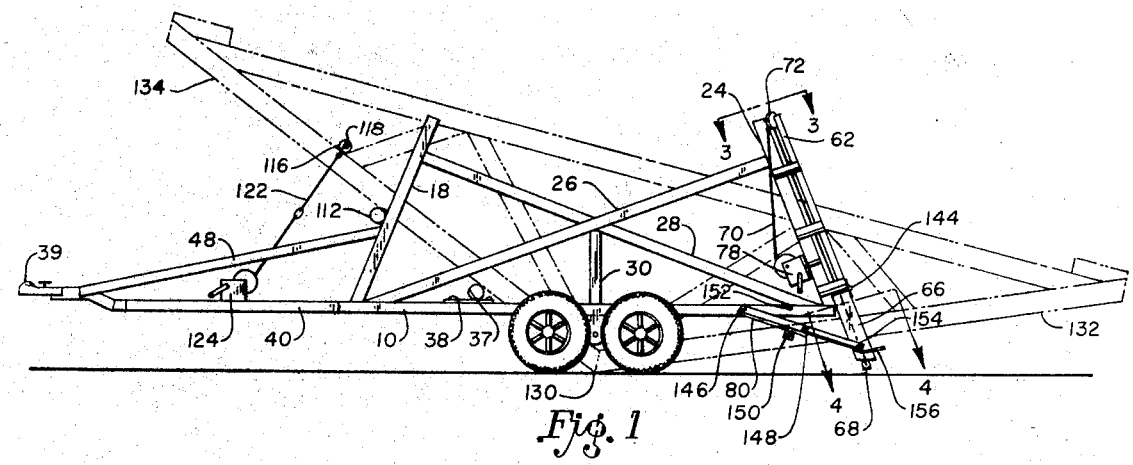
FIG. 1 is a side view of a trailer with a truss bundle shown in phantom lines.
Figure 2:
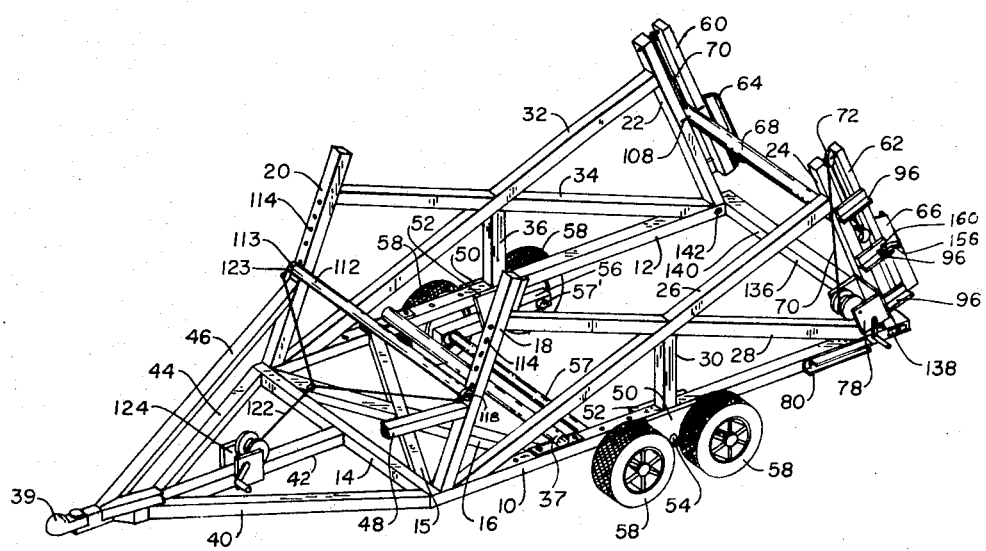
FIG. 2 is a rearwardly directed perspective view of the trailer.
Figure 5:
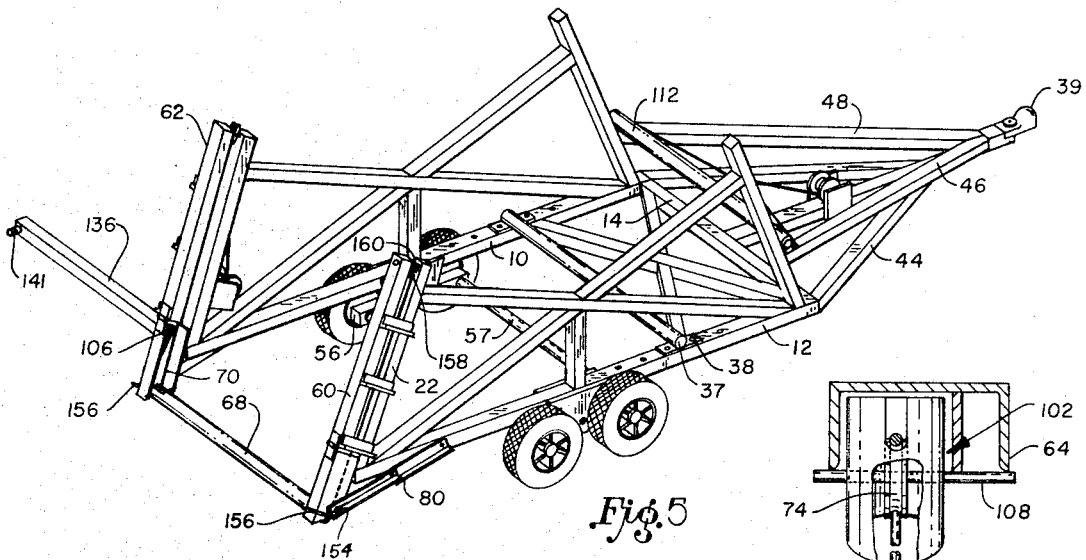
FIG. 5 is a forwardly directed perspective view of the trailer.

Referring to the drawings, and particularly FIGS. 1, 2 and 5, the truss transporting or trailer body generally comprises longitudinal bed members 10 and 12, transverse bed member 14, crossed bed members 15 and 16, end posts 18, 20, 22 and 24, and rigidifying members 26, 28, 30, 32, 34 and 36. These members are preferably of heavy, rectangular cross-section, tubular steel and welded at the joints. Another member 37 is fixed to plates 38 which may be bolted to bed members 10 and 12 through holes suitably provided therein and spaced to give any number of positions longitudinally of the trailer. It is seen that longitudinal bed members 10 and 12 and 37 define a bay for the accommodation of trusses as shown in FIG. 1.

The trailer hitch structure comprises a typical socket member 39 affixed to a suitable supporting frame such as that shown comprising members 40, 42, 44, 46 and 48. Also in accordance with the present invention, the present truss carrying body can be an integral part of a truck body, in which case, the hitch assembly is obviated and the bed members are integral with the truck frame.

The trailer is preferably provided with pairs of parallel plates 50 and 52 secured to bed members 10 and 12 and rotatably supporting by means of spindles 54, wheel mounting bars 56 through which the axles 57 and 57' for wheels 58 are fixedly secured. The wheels may be of conventional heavy duty trailer type containing sets of tapered roller bearings. It is apparent that bars 56 may rotate within limits on spindles 54 to allow all of the wheels 58 to remain in contact with the terrain normally encountered at construction sites. Other wheel mounting construction well known in the art may, of course, be used, and the present invention is not limited to any particular wheel or suspension structure.

An important feature of the trailer, as indicated above, is a lift assembly located at the rear of the trailer, which, in cooperation with the novel bed construction, allows extremely simplified loading and unloading of large truss bundles.

The lift assembly shown in the drawings and representing a particularly preferred one comprises upwardly directed guide means comprising the rear end posts 22 and 24, guide posts 60 and 62, lift bar 68, power means to move said lift bar comprising lift cable 70, post pulley 72 (see FIG. 3), lift bar pulleys 74 and 76 (see FIG. 4), and a winch, preferably a ratchet type, generally designated 78. Optionally, channel guides 64 and 66 and positioning members 80 are provided. In FIG. 2 the channel guides 64 and 66 are shown in their retracted or travelling position, while in FIGS. 1 and 5 they are shown in their loading or unloading position.

Figure 3:
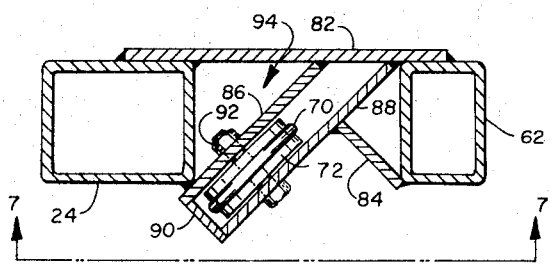
FIG. 3 is a top view of the upper pulley arrangement of FIG. 1 taken along 3—3 thereof in the direction of the arrows.
Figure 7:
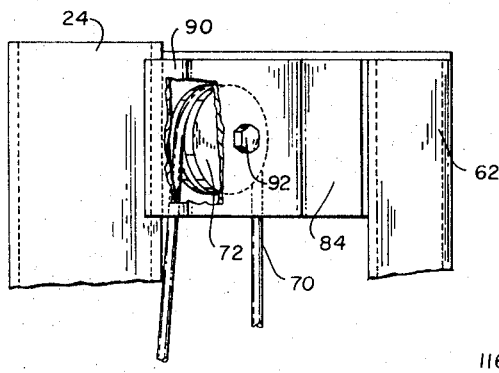
FIG. 7 is a side view of the upper portion of the pulley support arrangement taken along 7-7 of FIG. 3.

In FIGS. 1, 2 and 5, the mounting structure for post pulley 72 is not shown for purposes of clarity, and reference is made to FIGS. 3 and 7 for details thereof. Pulley 72 is shown mounted at an angle between end post 24 and guide post 62 by means of welded plates 82, 84, 86, 88 and 90. Pulley arbor 92 rotatably supports pulley 72 such that lift cable 70 is substantially centered in the slot generally designated 94 formed by parallel posts 24 and 62 and tie members 96 which are shown as angle iron.

Figure 4:
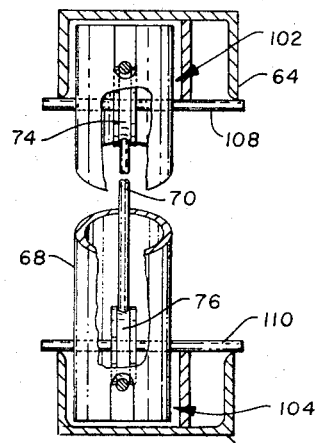
FIG. 4 is a view, partly in section, taken along line 4—4 of FIG. 1 in the direction of the arrows.
Figure 6:
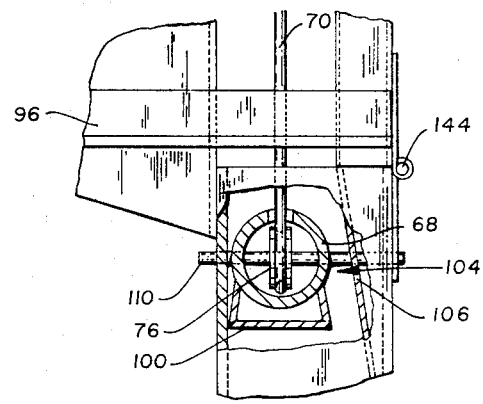
FIG. 6 is a side view with portions broken away of the upper portion of one of the retractable guides and adjacent rear posts.

Referring to FIGS. 4 and 6, the lift bar 68 is shown as a heavy metal pipe extending between the webs of channel guides 64 and 66 when in loading or unloading position. A pair of aligning appendages such as 100 are fixed to the ends of lift bar 68 to limit rotation thereof in post slot 94 and in an equivalent post slot 95 between posts 22 and 60 and in channel slots 102 and 104 formed by the webs and flanges of channel guides 64 and 66. As shown in FIG. 6, a lead member 106 is fixed in each of slots 102 and 104 to guide the ends of lift bar 68 from the channel guides into post slots 94 and 95. Lift bar pulleys 74 and 76 are mounted on shafts 108 and 110 respectively which are preferably press fitted, welded or otherwise fixed through the walls of lift bar 68 to extend beyond the flanges of the channel guides. These shafts normally clear the flanges but can bear against them to act as stops to prevent the ends of lift bar 68 from engaging the webs of the channel guides and impeding smooth raising or lowering of said bar. These shafts perform the same function in limiting longitudinal motion of the lift bar when it is being raised or lowered in post slots 94 and 95, by means of their bearing on the inwardly facing surfaces of the paired end posts 22 and 24, and guide posts 60 and 62.

It is noted that the particular shape of the guide means, lift bar and power means shown in the drawings represents an especially suitable and novel arrangement, however, applicant does not wish to limit his invention to such construction exclusively. It is apparent to those skilled in the art that rather than a pulley arrangement it is possible to employ other lifting devices such as a suitably arranged jacking system or even a motorized rack and pinion gear arrangement. An important and inventive aspect of the lifting arrangement is that the lift bar can be moved into lifting position after the trusses are tilted forward as shown in FIG. 1. This novel concept allows the self loading feature of the transporting body to operate, and, if necessary, to be operated by one person with a minimum of effort and without the need for extrinsic lifting machinery.

A truss supporting means comprising front support bar 112, preferably of heavy metal pipe, is adjustably attached to front end posts 18 and 20 by U-bolts 113 insertable into apertures 114 spaced in said posts to allow height adjustment for bar 112 in order to accommodate, in cooperation with lift bar 68 and oftimes member 37, trusses of varying pitch and size.

Figure 8:
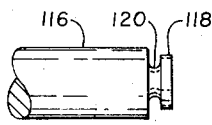
FIG. 8 is a side view of one end portion of the pull-down bar.

Referring to FIG. 1, a pulldown bar 116, preferably of heavy metal pipe, is provided as shown in FIG. 8 with a projection 118 and circumferential groove 120 at each end to provide a detatchable connection for pulldown cable 122 provided at its ends with hooks 123 to slide over the projections 118 and nest in grooves 120. A front winch 124, preferably ratchet type, secured to member 42 provides pulldown force to bar 116. Placement, of course, of winches 78 and 124 are a matter of choice and convenience. As shown in FIGS. 2 and 5, bar 116, when not in use, can be stored conveniently by disconnecting cable 122 therefrom, sliding it longitudinally into the larger diameter front support bar 112, reconnecting cable 122 to one end of bar 116 and into one end of bar 112, and tensioning the cable with winch 124.

Referring to FIG. 1, a bundle of trusses is shown in phantom outline in an inverted position with its apex resting on the ground. In getting the truss bundle into such a position, the bundle is initially tipped to rest on rafters 132 and the trailer is then backed under rafters 134 to any convenient position depending on the size and pitch of the trusses. Since there are no fixed transverse bed members rearwardly of bed members 15 and 16, the trailer may be backed under the rafters 134 until said rafters bear against the front support bar 112 or member 37, or both, so that the trusses do not bear on axle 57. Bar 112, as aforesaid, may be adjusted up or down on front end posts 18 and 20 whereby apex 130 of the bundle will be positioned where desired longitudinally of the trailer.

It is noted that a tie bar 136 as shown in FIG. 2, used to stabilize the trailer after the trusses have been loaded, and hinged at 138 to bed member 10, is disconnected from bed member 12 and swung out of the way in order to allow positioning of the trusses as shown in FIG. 1. The latching of bar 136 to member 12 may be accomplished by any convenient means. For example, a short projection 141 may be welded onto the inner forward surface of its end 140 to project into the end of bed member 12 and then removably pinned as at 142 (see FIGS. 2 and 5).

With the truss bundle in the position wherein rafters 132 are resting on the ground, pulldown bar 116 is inserted through the bundle as shown in FIG. 1, its ends attached to cable 122, and pulled down by winch 124 to tip the bundle against front support bar 112 or member 37 as shown in FIG. 1. It is noted that various alternative devices will become apparent to those skilled in the art to accomplish tipping of the truss bundle, and applicant does not intend to be limited exclusively to the pulldown means shown. At this point the channel guides 64 and 66 are pivoted downwardly on their hinges 144 from their up position shown in FIG. 1 to position their lower ends adjacent the ground. Positioning members 80, conveniently pivoted at 146 and pivotally segmented at 148, are flexed outwardly from bed members 10 and 12 to remove an apertured projection 150 from short studs 152 on members 10 and 12 to allow members 80 to be swung into the position shown in FIG. 1 and removably pinned by studs 154 on brackets 156 on the channel guides to stabilize them during the loading operation.

Lift bar 68 is then positioned between the lower ends of channel guides 64 and 66, and cable 70 attached by hook 158 (see FIG. 5) to a heavy pin 160 secured to posts 22 and 60 such that cable 70 is substantially centered in post slot 95. By the operation of winch 78, lift bar 68 is then drawn upwardly through the channel guides and into post slots 94 and 95 to the desired height. Cable 122 may then be further tightened to hold the bundle firmly against front support bar 112.

The channel guides are then retracted by lifting positioning members 80 off of studs 154 on brackets 156, and pivoting the guides to their up positions whereby brackets 156 may be removably pinned to their adjacent tie members 96 by any convenient means such as a bolt 160 dropped into aligned apertures in each bracket 156 and adjacent tie member.

As indicated above, the use of channel guides 64 and 66 is not always necessary and the particular construction shown may be optional. For example, for certain high pitch trusses, the rear rafters 132 are raised quite a bit above the ground and lift bar 68 can be inserted directed into the post slots 94 and 95. Also, it is apparent that the rear posts 22 and 24 and guide posts 60 and 62 may be lengthened to below the bed members 10 and 12 to eliminate the need for the channel guides. In such a case, their increased length must be limited to avoid contact with the ground when travelling, and member 136 would either be eliminated or attached to the lower portions of posts 60 and 62 by any suitable means.

It is particularly noted, as seen from FIG. 1, that the inclining of the front and rear posts allows the weight force of the trusses to be exerted substantially longitudinally of the posts and thus provides relative increased supported strength as well as greater ease of lifting through lift bar 68. Also, of particular advantage through this structure is that as the truss supporting means 112 is adjusted upwardly, its longitudinal distance to the lift bar 68 in any particular position is decreased. This longitudinal adjustment adapts the transporting body to trusses of different pitch and sizes.

The invention has been described in detail with particular reference to certain preferred embodiments thereof, but it will be understood that variations and modifications may be made without departing from the spirit and scope of the invention as described hereinabove.

I claim:

1. A wheeled, truss transporting body comprising a forward section, side means extending rearwardly from said forward section to define therewith a truss accommodating bay open at the rear of said body, truss supporting means extending laterally of said forward section, upwardly directed guide means on the rear of each of said sides, a lift bar adapted to be positioned in said guide means to extend laterally across the rear of said body, power means to move said lift bar upwardly or downwardly in said guide means, and pulldown means provided at said forward section and adapted to engage the forward portion of an inverted truss bundle and rotate it downwardly about its apex.

2. The transporting body of claim 1 wherein said guide means comprises upwardly directed structural members forming cooperating slots, and the end portions of said lift bar are adapted to slidably fit therein.

3. The transporting body of claim 2 wherein said power means comprises pulley wheel means at each end of said lift bar, pulley wheel means on an upper portion of one of said guide means, cable means removably attached at one end to an upper portion of the other of said guide means and engaging the pulley wheel means on said lift bar and on said guide means, said cable and pulley arrangement being operable to elevate and lower said lift bar in said guide means.

4. The transporting body of claim 2 wherein said truss supporting means is secured to posts attached to and extending upwardly from the sides of said forward section.

5. The transporting body of claim 4 wherein cooperating securing means is provided on said posts and said truss supporting means to allow adjustment of said supporting means in upward or downward directions.

6. The transporting body of claim 4, wherein said posts and said structural members of said guide means are inclined on the same side toward each other.

7. The transporting body of claim 6 wherein cooperating securing means is provided on said posts and said truss supporting means to allow adjustment of said supporting means along said posts to simultaneously give height and longitudinal adjustment to said supporting means.

8. The transporting body of claim 7 wherein an inverted truss bundle is positioned in said bay with the forward rafters thereof bearing on said truss supporting means and the rearward rafters thereof bearing on said lift bar, said lift bar being in an elevated position whereby said truss bundle is elevated above the ground.

* * * * *